US009612921B2

(12) United States Patent
Ferguson (10) Patent No.: US 9,612,921 B2
(45) Date of Patent: Apr. 4, 2017

(54) METHOD AND SYSTEM FOR LOAD BALANCING A DISTRIBUTED DATABASE PROVIDING OBJECT-LEVEL MANAGEMENT AND RECOVERY

(71) Applicant: TERADATA US, INC., Dayton, OH (US)

(72) Inventor: Gregory Paul Ferguson, Toronto (CA)

(73) Assignee: Teradata US, Inc., Dayton, OH (US)

(*) Notice: Subject to any disclaimer, the term of this patent is extended or adjusted under 35 U.S.C. 154(b) by 73 days.

(21) Appl. No.: 14/193,266

(22) Filed: Feb. 28, 2014

(65) Prior Publication Data

US 2014/0250326 A1 Sep. 4, 2014

Related U.S. Application Data

(60) Provisional application No. 61/771,789, filed on Mar. 1, 2013.

(51) Int. Cl.
*G06F 11/00* (2006.01)
*G06F 11/14* (2006.01)

(52) U.S. Cl.
CPC ...... *G06F 11/1471* (2013.01); *G06F 2201/80* (2013.01)

(58) Field of Classification Search
CPC ............ G06F 11/1435; G06F 11/1438; G06F 11/1469; G06F 11/1471; G06F 11/1474; G06F 11/141; G06F 11/2064; G06F 2201/80

USPC ................................................... 714/16, 20
See application file for complete search history.

(56) References Cited

U.S. PATENT DOCUMENTS

| | | | | |
|---|---|---|---|---|
| 5,065,311 | A * | 11/1991 | Masai | G06F 11/1402 714/20 |
| 5,546,576 | A * | 8/1996 | Cochrane | G06F 17/30371 |
| 6,567,928 | B1 * | 5/2003 | Lyle | G06F 11/1471 707/999.202 |
| 7,290,056 | B1 * | 10/2007 | McLaughlin, Jr. | H04L 43/0852 709/201 |
| 7,680,831 | B1 * | 3/2010 | Gandhi | H04L 41/0654 707/999.2 |
| 9,037,558 | B2 * | 5/2015 | Fries | G06F 17/30864 707/703 |
| 2002/0143746 | A1 * | 10/2002 | Levy | G06F 17/3051 |
| 2008/0162590 | A1 * | 7/2008 | Kundu | G06F 11/1471 |
| 2011/0029498 | A1 * | 2/2011 | Ferguson | G06F 17/30545 707/703 |
| 2011/0213756 | A1 * | 9/2011 | Chen | G06F 17/30563 707/684 |
| 2012/0151272 | A1 * | 6/2012 | Behrendt | G06F 9/542 714/39 |

(Continued)

*Primary Examiner* — Yair Leibovich
(74) *Attorney, Agent, or Firm* — James Stover (57) ABSTRACT

A method and system for managing operational states of database tables within a multiple-database system. If a particular user session issues a query against a target table that causes a data inconsistency, the target table transitions into an errant state and the session will become interrupted. This errant state is then propagated onto any other table associated with the user session. A session-level recovery process can thereafter be executed to repair and restore database tables associated with the interrupted user sessions without the need to take an entire database system offline.

4 Claims, 5 Drawing Sheets

(56) References Cited

U.S. PATENT DOCUMENTS

2012/0330954 A1\* 12/2012 Sivasubramanian . G06F 9/5061
707/737
2015/0156276 A1\* 6/2015 Xue ........................ H04L 67/32
709/203

\* cited by examiner

METHOD AND SYSTEM FOR LOAD BALANCING A DISTRIBUTED DATABASE PROVIDING OBJECT-LEVEL MANAGEMENT AND RECOVERY

CROSS REFERENCE TO RELATED APPLICATIONS

This application claims priority under 35 U.S.C. §119(e) to the following co-pending and commonly-assigned patent application, which is incorporated herein by reference:

Provisional Patent Application Ser. No. 61/771,789, entitled "IMPROVED METHOD AND SYSTEM FOR LOAD BALANCING A DISTRIBUTED DATABASE PROVIDING OBJECT-LEVEL MANAGEMENT AND RECOVERY," filed on Mar. 1, 2013, by Gregory Ferguson.

This application is related to the following commonly-assigned patents and patent applications, which are incorporated by reference herein:

U.S. Pat. No. 8,209,696, entitled "METHOD AND SYSTEM FOR LOAD BALANCING A DISTRIBUTED DATABASE," issued on Jun. 26, 2012, by Gregory Ferguson, Jeffrey Heisz, David Tung, Muhammad Mansoor Jamal, and Ariff Kassam; and U.S. Pat. No. 8,209,699, entitled "SYSTEM AND METHOD FOR SUBUNIT OPERATIONS IN A DATABASE," issued on Jun. 26, 2012, by Gregory Ferguson, Jeffrey Maurice Heisz, Richard Ta-Min, Yi Wang, and Branko Daljevic.

FIELD OF THE INVENTION

The invention relates generally to the field of database applications, and more specifically to the management of database subsystem object states and a session-level recovery process for restoring/repairing database subsystem objects without the need to take an entire system offline.

BACKGROUND OF THE INVENTION

As companies everywhere are collecting, storing, and analyzing huge amounts of data from ever-increasing sources, they're discovering that not all data is equal. Some must support mission-critical applications and be constantly available. Other data may be time-sensitive. And still other data is retained simply for historical or regulatory requirements.

One way businesses have chosen to deal with these different types of data is by employing multiple analytical systems; each tuned for its data and workload. These multi-system environments can be very effective when they're designed to add value, not complexity. However, a multi-system environment introduces new challenges such as cost, multiple products, operational complexity, and the potential for fragmented or multiple versions of data.

In previous implementations of database load balancer solutions, such as the systems described in U.S. Pat. Nos. 8,209,696, and 8,209,699, referenced above, any inconsistency between systems that was detected by the load balancer would result in a state level change that applied to the system as a whole. For example, a SQL query that performed an update on a table but returned a different activity count on each system, e.g., number of rows modified, would result in one or more of the systems being marked unsynchronized—in other words, affecting all other tables on the system as well. Likewise, transient conditions, such as database free space issues, that could be corrected would also apply to the system as a whole, rather than a more restricted subset of tables to which the condition actually applied. It should also be noted that standard administrative operations, such as taking a database component offline or making it read-only could only be performed at the system level.

Teradata Corporation has introduced an improved Teradata Unity product that helps a business route intelligence query workloads between two or more relational database production systems to load balance and maximize utilization of the systems. In the improved Teradata Unity product, existing database load balancer algorithms have been expanded to allow for a more granular processing of the error conditions that are detected in the course of normal operation. Specifically, the new algorithms allow for the application of operational state, e.g., administrative tasks and/or transient or inconsistency errors, to apply at a subsystem level. In the discussion below, these algorithms are described as occurring at a database table level, but the algorithms could equally apply to less granular entities, such as databases, or more granular entities, such as database table rows. These novel extensions to the underlying algorithms provide a more correct representation of the state of the systems, i.e., the cluster, as a whole while also allowing for the continued operation of the load balancing for other applications and queries that utilize the affected system but not the affected tables.

BRIEF DESCRIPTION OF THE DRAWINGS

For a better understanding of embodiments of the system and methods described herein, and to show more clearly how they may be carried into effect, reference will be made by way of example, to the accompanying drawings in which.

DETAILED DESCRIPTION OF THE INVENTION

As stated above, in the new Teradata Unity product, the prior database load balancer algorithms have been expanded to allow for a more granular processing of error conditions that are detected in the course of normal operation. Specifically, the new algorithms allow for the application of operational state, e.g., administrative tasks and/or transient or inconsistency errors, at a subsystem level. As described herein, the improved algorithms are applied at a database table level, but the algorithms could equally apply to less granular entities, such as databases, or more granular entities, such as database table rows. These novel extensions to the underlying load balancer algorithms provide a more correct representation of the state of the systems as a whole, while also allowing for the continued operation of the load balancer for other applications and queries that utilize an affected system, but not the affected tables.

Figure 1:
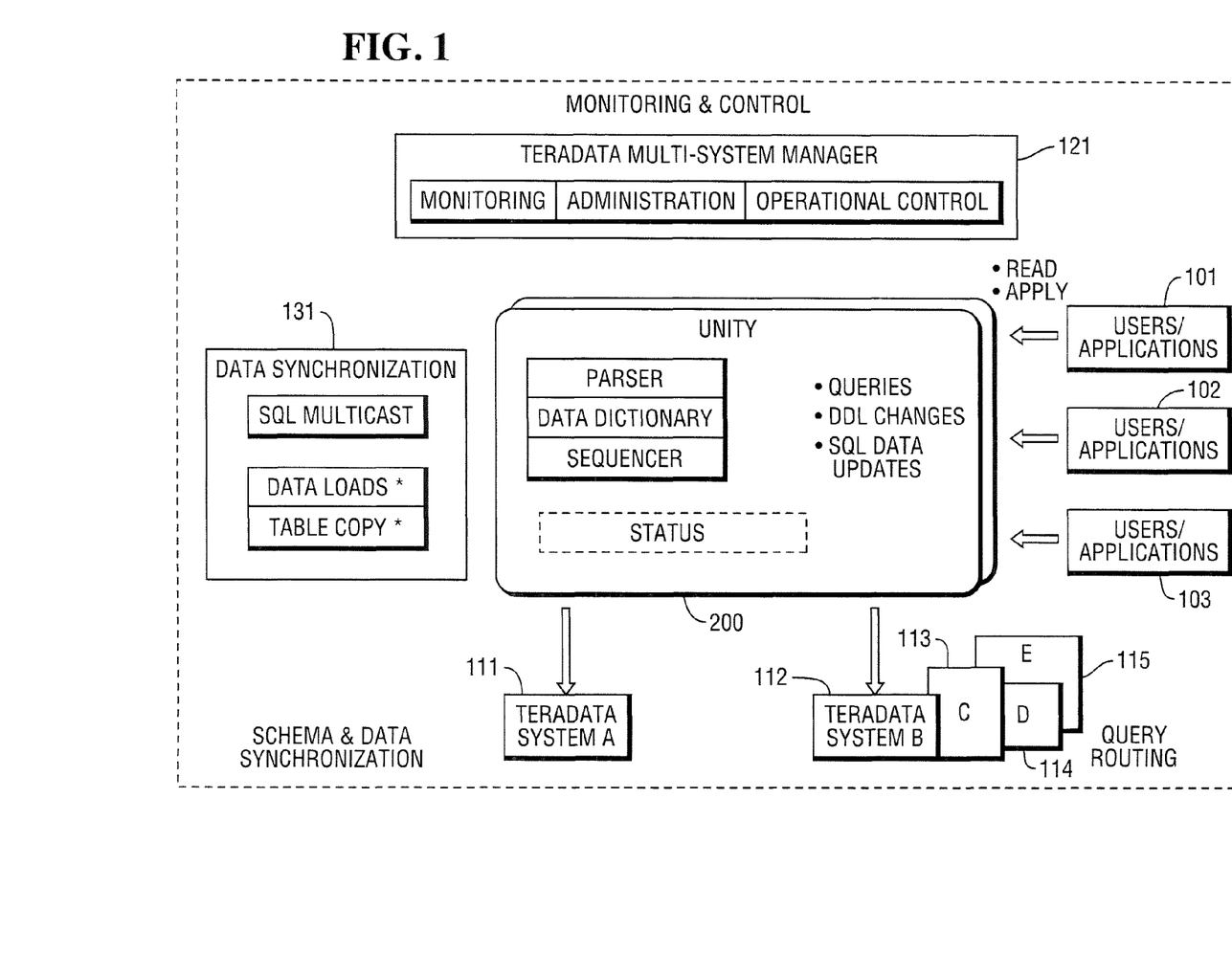
FIG. 1 is a block diagram of a multiple database system including Teradata Unity.

FIG. 1 provides a block diagram of a multi-system environment wherein multiple users/clients 101 through 103 communicate with multiple Teradata Corporation production systems 111 through 115. The Teradata Unity product provides a portfolio of integrated components that enable users 101-103 to orchestrate the multi-system environment. Teradata Unity components, including Monitoring and Control 120, Data Synchronization 131, and Unity Director Server 200, automate and simplify database access for users, and enable high system availability, workload optimization, and disaster recovery across the multi-system environment.

Monitoring & Control 121 provides system monitoring and control capabilities. It pulls together all parts of the multi-system environment to help model the relationships among all parts of the multi-system environment. It monitors hardware components, processes, and the state of data throughout the multi-system environment. Monitoring & Control 121 ties all the parts of the multi-system environment together so that the interdependencies are defined. For example, whenever there are users and applications that are dependent on new data being loaded into a database, Monitoring & Control 121 can model that dependency so that when the extraction, transformation, load (ETL) server is non-operational, downstream implications are easily identified. Monitoring & Control 121, in essence, models the dependencies of the multi-system environment.

Data Synchronization 131 provides database synchronization and intelligent data loading. Data Synchronization 131 provides the capability of directing bulk loads to more than one database system and keeping track of completion status for the client. Data Synchronization 131 analyzes incoming data loads and automatically determines which systems to send the loads. Load jobs and queries that depend on the data are sequenced so that users always get the most up-to-date results.

Unity Director Server 200 provides data synchronization, user and query routing. Routing users and queries to the correct system is a requirement for high-availability systems, where the expectation is that when one system becomes non-operational, users are easily routed to an alternate system. Unity Director 200 delivers this functionality. It allows user and query routing to be selective and transparent to the users. Unity Director is a powerful feature that allows administrators to control how to route and re-route users, and helps load balance users between systems. Unity Director intelligently determines which database system can satisfy a query and automatically routes the query accordingly. It also routes SQL commands for database updates (DD L) and data updates (DML). In doing so, it keeps databases in synchronization across systems, applying the same changes to multiple systems within the multi-system environment.

Figure 2:
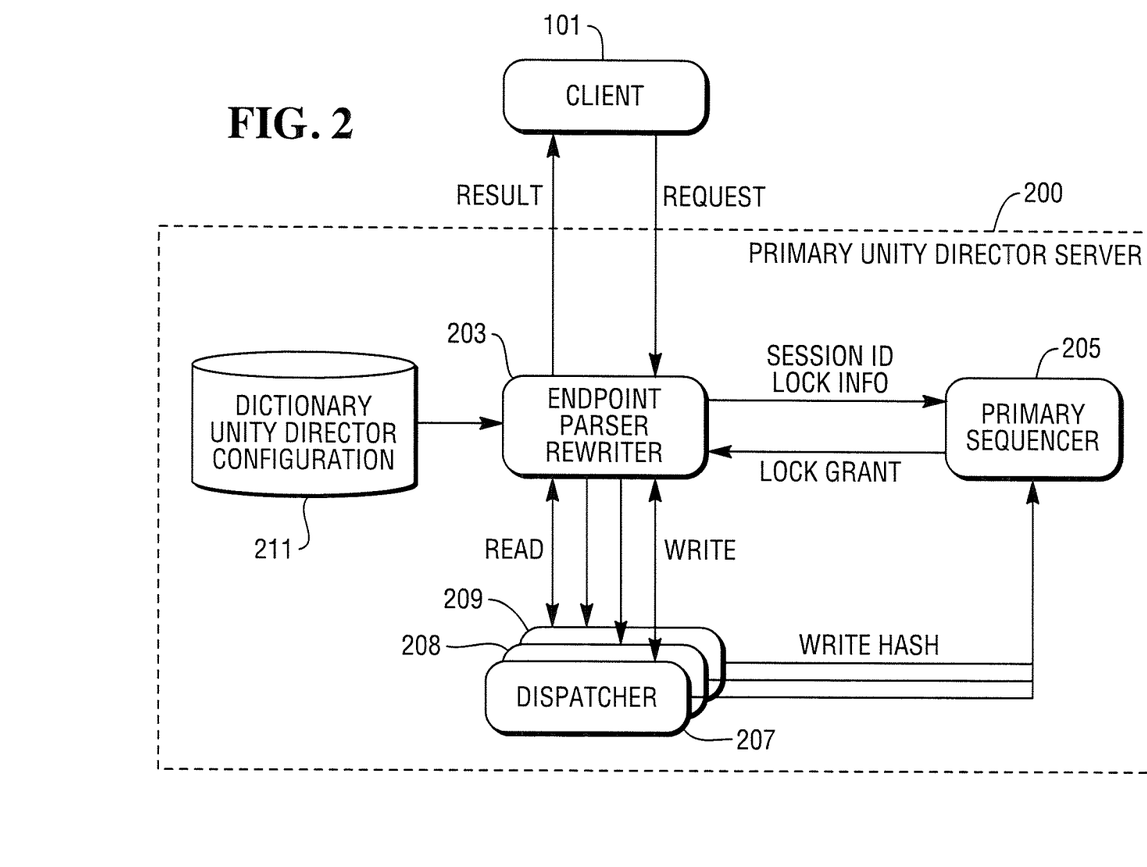
FIG. 2 is a block diagram of the Teradata Unity Director Server.

A block diagram illustrating the structure and operation of the Teradata Unity Director Server is provided by FIG. 2. Major processes within Unity Director Server 200 include Endpoint Process 203, Sequencer Process 205, Dispatcher Processes 207 through 209, and Dictionary Process 211.

Endpoint Process 203 connects users to the multi-system environment as if they were connecting directly to a database system. The standard Unity Director Server setup is a single Endpoint process that listens for available IP addresses on each Unity Director Server. Endpoint processes automatically stop listening when there are no underlying systems available to receive open connection requests.

Additional multiple Endpoint Processes can be deployed on the same Unity Director Server, or on different servers. Typically, an additional process is deployed on the same server for Standby IP Addresses. This Endpoint Process is configured with a list of Standby IP (SIP) addresses that is enabled if all default Endpoints in an associated Region fail.

Figure 3:
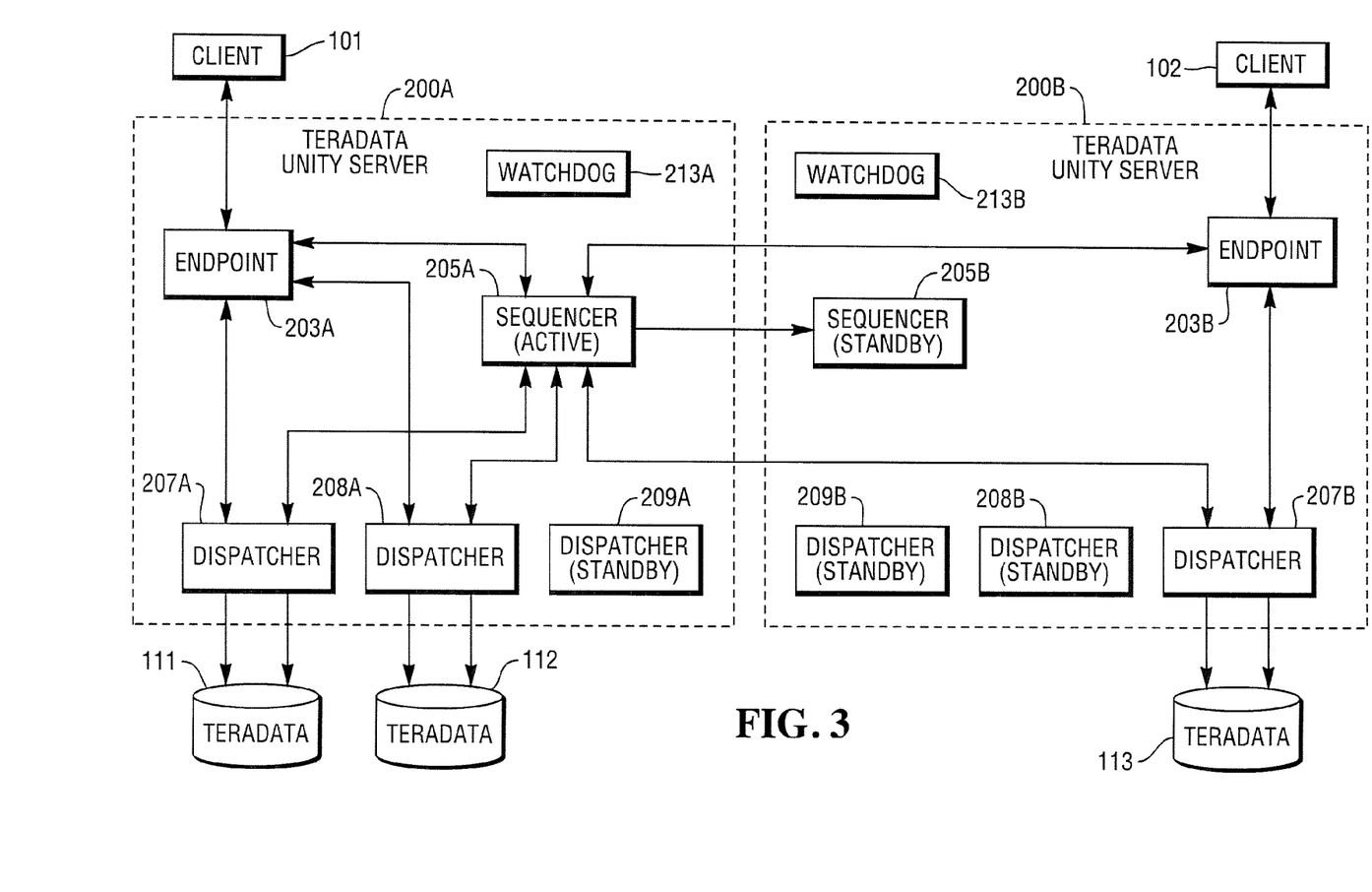
FIG. 3 is a block diagram illustrating the communication between multiple Teradata Unity Director Servers and multiple Teradata Databases.

When two Unity Director Servers are deployed, as shown in FIG. 3, client applications can connect to the Endpoint Process on either server. All Endpoint Processes, except those used for Standby IP Addresses only, can accept client application connections.

Sequencer Process 205 receives and processes client SQL statements from Endpoint Processes. In a dual-system configuration, the Sequencer Process on one system is in an Active state while the Sequencer on the other server is in a Standby state.

Dispatcher modules 207 through 209 determine data accessibility through Unity Director Server 200 to a database system. Each Dispatcher module maintains states for the database systems independently. There are two levels of states: System Access, which indicates database system accessibility or accessibility to one of its components; and Data Access, which indicates accessibility for the database systems or individual tables for a specific database system or across all database systems.

Unity Dictionary 211 defines database objects in a Teradata Database system that when deployed can be managed by Unity Director. Unity Director uses Unity Dictionaries to determine session routing for database objects it manages, and to determine how locking rules are applied when client requests are routed through it.

In many cases, Unity Data Dictionaries do not include all databases and database objects across a Teradata Database system. The database objects selected for a dictionary can include only the objects appropriate to the client application or users that Unity Director is configured to manage. For example, if a Teradata Database system contains 800 tables, an administrator can create a Unity Data Dictionary to manage only a subset of these tables, for example 250 tables. In this way, it is possible to create separate Unity Data Dictionaries for each client application and deploy these as needed in the Deployed Dictionary on each Unity server that manages the client application. Because the Deployed Dictionary is comprised of one or more deployed dictionaries, an administrator can design a Deployed Dictionary to optimize database object management and session routing across their Teradata systems.

An administrator can use a Unity Configuration portlet and the AdminUnity command line interface to manage Unity Data Dictionaries. Using the Unity Configuration portlet, an administrator defines a Data Dictionary and specifies which database objects are included in the dictionary definition. At this point, the dictionary is not managed by Unity Director. To become managed, an administrator next verifies that the dictionary definition is complete and deploys it in the Deployed Dictionary. After it is deployed, Unity Director manages all objects in the deployed dictionaries. Such objects are referred to as managed objects. The AdminUnity command line interface allows an administrator to delete, deploy, undeploy, export, import, scan, and reload a Unity Data Dictionary. See the AdminUnity Command Line Syntax appendix in the Unity Director User Guide for details.

FIG. 3 is a block diagram illustrating the communication between multiple Teradata Unity Director Servers 200A and 200B and multiple Teradata Databases 111 through 113. As shown in FIG. 2 and discussed above, the major processes within Unity Director Servers 200A and 200B include Endpoint Processes 203A and 203B, Sequencer Processes 205A and 205B, Dispatcher Processes 207A through 209A and 207B through 207C, and Dictionary Processes 211A and 211B. Each Unity Director Server is also seen to include a Watchdog process 213A and 213B.

In the dual Unity Director Server configuration shown in FIG. 3, Sequencer Process 205A is shown as active, receiving and processing SQL statements for both Unity Director Servers, while Sequencer Process 205B is in a standby state. Watchdog Processes 213A and 213B monitor Sequencer operations to determine which Sequencer Process is Active and which is Standby. Each Watchdog process maintains a heartbeat connection with both the local and remote processes.

Similarly, Dispatcher Process 207A, 208A, and 207B are shown as active, managing data accessibility to database systems 111, 112, and 113, respectively, while Dispatcher Processes 209A, 208B, and 209B are in a standby state.

Table States

As stated above, the new algorithms described herein allow for the application of operational state, e.g., administrative tasks and/or transient or inconsistency errors, to apply at a database system and database table level.

Figure 4:
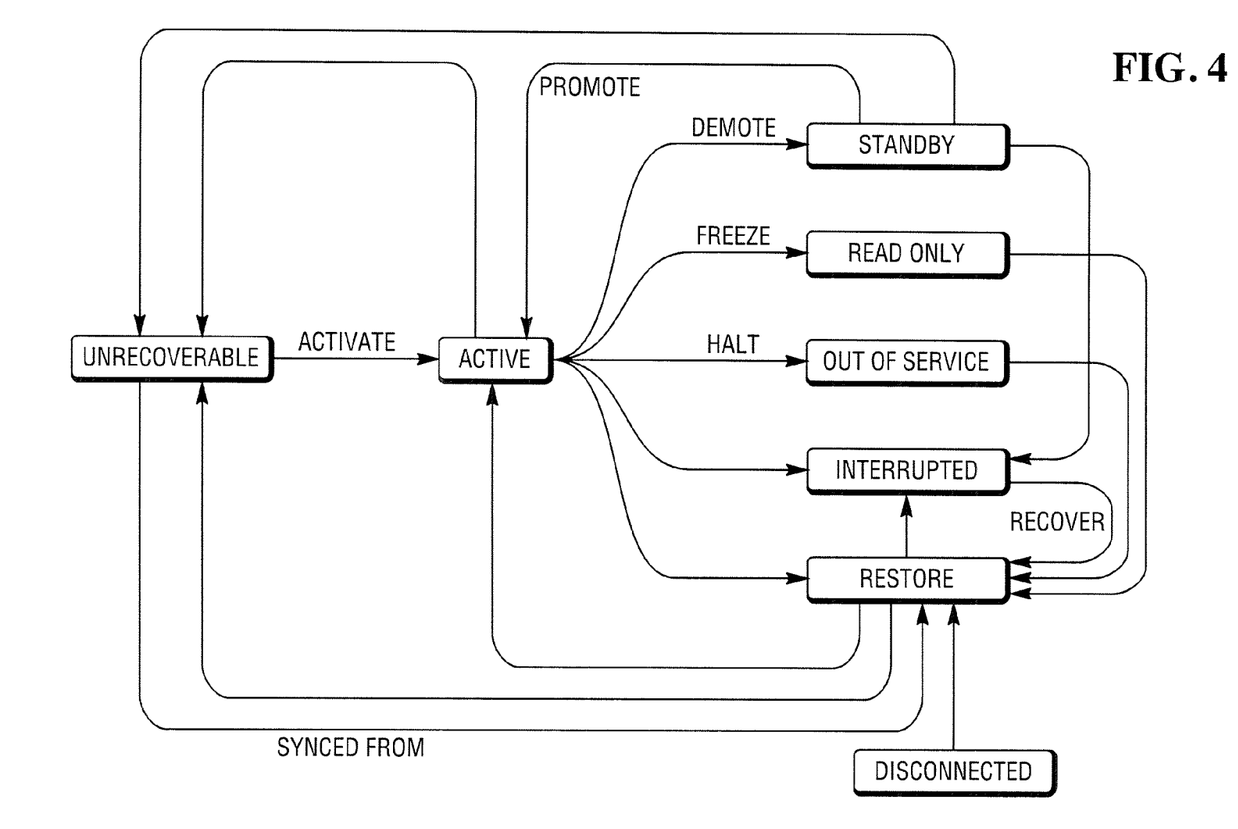
FIG. 4 is a diagram illustrating database system table states and state transitions.

The database system or database tables can be in one of the following eight states: Active, Standby, Read-Only, Out Of Service, Interrupted, Restore, Unrecoverable, or Disconnected. The diagram of FIG. 4 illustrates Teradata Database system and table states, wherein arrows represent state transitions due to user operations or automatic operations.

The table provided below shows when SQL statements are allowed depending on the database table state. A description of the database system and table states follows.

| Table State | Read | Write |
| --- | --- | --- |
| Disconnected | No | No |
| Out-of-Service | No | No |
| Unrecoverable | No | No |
| Interrupted | No | No |
| Restore | No | No |
| Standby | No | Yes |
| Read-Only | Yes | No |
| Active | Yes | Yes |

Active State

When in Active state, the database or table is enabled for Unity Director Read and Write requests. The database system state must be Active, Standby, or Read Only to establish sessions on the database system. Clients cannot access data on the database system in the Unrecoverable, Interrupted, Down, Restore, or Disconnected state. For Read/Write sessions, a database table must be Active on at least one database system to enable client access.

Standby State

If a database system or table is in a Standby state, it only receives writes to keep it up-to-date. Typically, no reads are sent to the database system or table in Standby unless no active database system or table is available to service that request.

Read-Only State

In the Read-Only state, only Read access is allowed to the database system or table. This state enables Read access for an application when data is externally copied from the table and must remain unchanged.

For Read/Write sessions, if a table is in a Read-Only state across all database systems, then Unity Director will queue the write until that table becomes active on one of the systems. If only a single database system or a table on a specific database system is in Read-Only state, then any Write requests remain queued in the Recovery Log to be replayed when the Teradata Database system or table is placed into a Restore state.

If a database system enters a Read-Only state, all tables automatically enter a Read-Only state. If a table is Read-Only on one or more systems and a Write occurs on this table (because the table is in Read-Write mode on at least one other active system), then the Read-Only state is changed to the Interrupted state.

Out of Service State

In the Out of Service state, no Read or Write requests are sent to a database system or table. If any Writes execute on other systems while a system or table is in the Out of Service state, these Writes are written to the Recovery log and applied when the system is placed into the Restore state. When a database system is placed Out Of Service, all active and Read-only tables in that system are also placed in an Out of Service state.

Interrupted State

Unity Director automatically places a database system or table in the Interrupted state upon encountering an automatically recoverable transient error. For example, when a session cannot be opened on a database system due to insufficient database system resources, it is placed in an Interrupted state. Additionally, Unity Director automatically places a database system in Interrupted state if all gateways for the database system are Down.

If a database system is Interrupted, it does not allow sessions to start. All tables are automatically placed in Interrupted state when a database system is placed in Interrupted state.

From Interrupted state, a Teradata Database system or table can do the following:

Automatically enter the Restore state. Unity Director periodically attempts to recover a Teradata Database system or table in the Interrupted state in case the issue is transient, Enter Restore state using a system recover command, and Be put into the Restore state if the dispatchers for the system are restarted or disconnected and then reconnected.

Restore State

The Restore state indicates a database system or table is recovering while Unity Director applies any missed writes from the Recovery Log. When in Restore state, the database system or table does not receive new reads or writes that apply to the database system or table undergoing recovery. During the recovery operation, Unity Director queued writes are processed for this database system and new writes are added at the end of the recovery queue.

Unrecoverable State

When a database system or table is Unrecoverable, Unity Director does not recognize the state of the data. Unity Director can automatically place a Teradata Database system or table in the Unrecoverable state if it encounters a data consistency error. Unity Director does not allow sessions on an Unrecoverable Teradata Database system. All tables automatically become Unrecoverable when a Teradata Database system is placed in the Unrecoverable state.

Disconnected State

The Disconnected state indicates the Dispatcher is down and preventing Unity Director from communicating with the Teradata Database system. Unity Director automatically transitions the Teradata Database system to the Recover state when the Dispatcher process restarts.

Entity Management and State Representation

In a system-level model, state management is relatively straightforward, as each system (object) in the internal representation has an associated state value. In the new model, there now exists a state value for each of the tables being managed by the database cluster, which can become a significant data management issue as the number of objects in the managed databases becomes large. The is also a new requirement for tighter coupling between the state management system and the "dictionary", as the latter contains the explicit entities being managed in the cluster for which state is required. Two considerations concerning the cluster state management model that apply to the database load balancing situation in particular are:

The load balancing algorithms maintain a record marker in the recovery log known as a "checkpoint". This represents a record at which the transactional state of all systems and operations is known and is used as the starting point for recovery operations. In the more granular instance, the checkpoint now requires state information for each table or entity for which state is being managed. Consideration must be provided for optimizing the checkpoint records when large number of objects are involved, for example, only recording differential records in the checkpoint along with other transition records in the recovery log.

Although the actual state tracking requirements are for the table and system levels only, there is an implied requirement for other objects to also inherit state tracking and management by the cluster to properly manage table state, even if such states are not provided to the administrator.

To illustrate, consider a situation where a macro is created that modifies a table, but the create fails inconsistently across the systems. Unless the state of the macro is also tracked, a subsequent usage of that macro should succeed on the system where the table create operation succeeded, but the underlying table should also be failed (see below) on the system where the macro creation failed. By extension, there is an implied requirement for state management of any entity that can modify an underlying table (e.g. macro, procedure, view, user, etc.)

Teradata Unity uses locking/sequencing information about the SQL queries flowing through it to extract the list of physical database objects that are read or written by a query, including subunit (row) granularity. This information, along with recovery log record IDs, forms an "object state" that allows Unity to both propagate state as new queries are sent through the system, e.g., one offline table causes another table to become offline as a queries is executed that depends on both, as well as allows us to recover individual objects, by recovering all dependent objects.

Previous versions of Teradata Unity, described in U.S. Pat. Nos. 8,209,696 and 8,209,699, employed algorithms for processing SQL queries, extracting the physical objects read or modified by the query, down to the subunit (row) level, and sequencing them such that queries executed in a consistent order on multiple database systems, not necessarily the same order. Two queries that did not conflict would execute concurrently, but two queries that did conflict would execute serially, in identical order. This allowed for optimal usage of the database system resources by allowing concurrent work, and guaranteed consistent data. This algorithm also allowed for database updates to be recorded to disk in a recovery log file with sequencing information attached, in a manner allowing for recovery of a database system that had been offline for a period of time.

The present invention provides an extension that builds on the output of the previous sequencing algorithm, using the table and row locking and sequencing information, along with new recovery log records and the record IDs of stored SQL queries, to implement object state propagation and allow for recovery of individual objects.

The algorithm formerly tracked object names and (lock) sequence numbers. The algorithm now additionally tracks the state of objects in the database, including:

Status:
  Active (the normal state),
  Interrupted (offline because of an unexpected failure),
  Out Of Service (a planned outage),
  Unrecoverable (data in the object is inconsistent and cannot be recovered),
  Restore (the object is being recovered), and
  various other management states (Read-Only, Write-Only)
A "last write" pointer that tracks the transaction/recovery log record ID of the last SQL query applied for each object at each database.
A list of unapplied writes that includes session ID, transaction ID, and log record ID of each write prior to the "last write" that must be applied for each object. This list is generally empty, but contains an element for each failed query when an object is "interrupted".

All elements of the object state are tracked in recovery log records, with the exception of the unapplied write list. That list is maintained in memory only, and reconstructed from recovery log entries in the event of a system restart.

State Propagation

As alluded to above, there is a "viral" element to the state management that didn't exist when the state applied to the least granular element (system). Any query against the system that modifies the state of an object/table based on another object must properly take into consideration the state of that object as well.

For example, a SQL query that does an insert into one table based on a select from another should pass along (infect) the target table based on the source table state—if the source table is unsynchronized, then the target table must also become unsynchronized as the data content is can no longer be considered correct. It is important to note that this propagation must occur without actually performing the underlying query, both for performance reasons and to also allow the possibility of recovering the table later.

There are a large number of query types that must be properly considered to ensure that the propagation of state is carried correctly. Also note, as described above, that there is a requirement for managing state of objects that modify other objects to ensure that intermediate states are also properly captured.

The mechanism that was introduced to accomplish this state propagation with the potential for recovery is known as session-level interrupt. In other words, the state changes are allowed to propagate, for a system, onto the associated session that the database load balancer has with that system. Essentially, the session-level interrupt mechanism works as follows: if a particular user session issues a query that causes a data inconsistency, the target object(s) transition into an errant state and the session will become interrupted. In this case, that session, while still being managed on the system in question, will enter this interrupted state where it will no longer perform write queries for that system and will "infect" this state onto any objects that it attempts to write data. This action allows the database load balancer to properly capture potential data error propagation through business logic being performed outside of the cluster, for example, an application attempting to update a table with a value that it computed from a select of an invalid table. Note that the transfer of the error states propagates both ways, e.g., a "normal" session that performs an operation on a system where it utilizes an object/table that is in an invalid state also inherits the state.

Because all data operations flow in a fixed specific order for a single session, the use of the interrupted session allows for the correct replay of missing/pending queries as all subsequent queries for that session are held/ignored and all affected objects propagate the errant state.

Recovery

In the system-level model, recovery of a system was essentially an ordered request-replay operation from the last known transactional state of the system, subject to the standard sequence ordering rules of the cluster. The starting location of the replayed requests was based on the last committed transaction for each session, as recorded in the system transaction table (and matched to the load balancer recovery log).

For the table-level granularity, it is not practical to extend the system transaction table to include a row for every database object/table on that system, although this is a possible solution for smaller environments. In addition, unlike the system-level case, the table-level scenario allows for continued updates on other objects/tables while the given errant table is offline. This is why the interrupted session model above is so important, as it ties in with a session-level, rather than system-level, recovery which is needed to properly perform concurrent, and possibly multiple, table-level recoveries while other sessions are potentially still actively modifying the database.

In summary, the new recovery algorithm is as follows: starting from a particular point in the recovery log, either a system restart or a specific table-level recovery, each operation is examined according to the "current" list of interrupted and recovering sessions at that time and only applied for those recovering sessions. In the case of system-level recovery, it is possible that, as the log is read, new sessions may be established directly into the interrupted/recovering state according to the information in the recovery log. Likewise, it is possible for the end/close of a session to be encountered as well, in which case that session recovery is complete. If a consistency error is encountered, then the session may return to the interrupted state along with the corresponding changes to the table state being applied. Once all of the outstanding requests for a table have been successfully replayed, that table will return to the active state. As the discussion of this solution presented above has been simplified; there are many other conditions to consider in handling multiple table-level recoveries in parallel.

If the Unity system itself fails or is restarted, then reconstruction of the above state from recovery log entries and the transaction table stored in the target database is the first step of the recovery process, termed "Rebuilding object state". This process is also responsible for determining if any database objects are now unrecoverable, because transactions cannot be applied in the order assigned by the sequencing algorithm. For example, SQL queries 1 and 2 both modify the same row, or portion of a table, if query 1 has failed, but 2 has committed, then the table is unrecoverable because 1 must be applied before 2. This mechanism uses the output of the subunit sequencing algorithm in U.S. Pat. No. 8,209,699 to determine if two queries really do conflict, and therefore if the condition is recoverable or unrecoverable.

If the Unity system did not fail, then this step is not required, the existing in-memory object state is sufficient to determine the tables that must be recovered, the source tables necessary for the recovery, and sessions (and associated session state) that must be established to the database system in order to apply the missing transactions.

In the second phase, the object state information is used to determine the earliest log record that must be applied. The recovery log is scanned from this record forward. Necessary sessions are re-established using information in the log, and transactions on those sessions for the recovering objects are reapplied, in the correct order assigned by the sequencing algorithm, updating the object state as the scan progresses. As the most recent update for each object is applied in the recovery process, the state is updated from "Restore" to "Active", and those objects are available for use while recovery of other objects continues. As the last outstanding update for a session is applied, the session becomes available to execute client queries.

Figure 5:
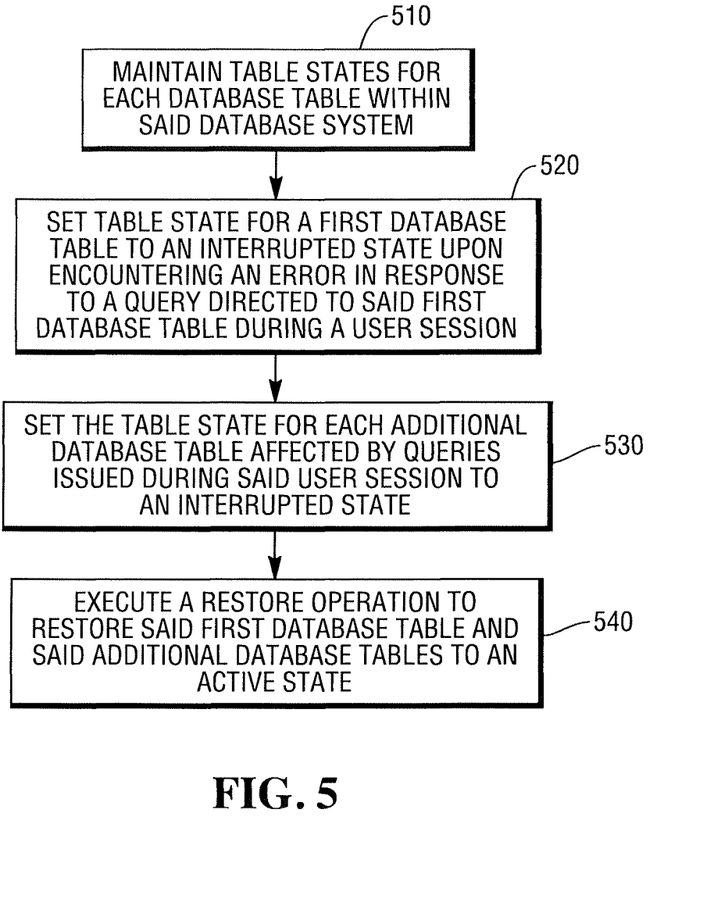
FIG. 5 is a flow diagram illustrating the application of operational states at a database table level in accordance with the present invention.

FIG. 5 provides a flow diagram illustrating, at a high level, the application of operational states at a database table level (step 510), state propagation (steps 520 and 530), and recovery process (step 540), described in greater detail above.

ADVANTAGES OF THE SOLUTION

A principal advantage of the solution described herein is that it provides a finer granularity of management for the database systems than the systems themselves. In the case of an error or other management intervention, it allows only the objects or tables involved to be put into an error condition while allowing other users/applications to utilize other objects on the system, and allows for concurrent recovery/repair of those objects without needing to take the entire system offline. This is an essential feature of Teradata Unity—for large data warehouse environments involving numerous databases and/or tables, the previous model of taking an entire system offline for a single error is quite impractical.

What is claimed is:

1. A computer-implemented method for recovering from database system errors, said method comprising the steps of:
   maintaining, within said database system, table states for each database table within said database system;
   setting the table state for a database table to an interrupted state upon encountering an error during a database operation affecting said database table, said database operation comprising a query issued during a user session that causes said database table to transition into said interrupted state;
   setting the table state for at least one additional database table affected by a query issued during said user session to an interrupted state;
   maintaining a recovery log containing a sequential list of database operations issued to said database system;
   placing a checkpoint marker in said recovery log indicating a starting point for said restore operations, said a checkpoint marker being placed in said recover log at periodic intervals;

executing a restore operation to restore said database table having an interrupted state to an active state; and executing a restore operation to restore said at least one additional database table having an interrupted state to an active state, wherein the execution of said restore operations to restore said database table having an interrupted state and said at least one additional database table having an interrupted state to active states includes the steps of:

identifying database operations listed in said recovery log which are associated with said user session; and re-executing said database operations listed in said recovery log which are associated with said user session and were entered into said recovery log following said checkpoint marker.

2. A computer-implemented method for recovering from database system errors, said method comprising the steps of:

maintaining, within said database system, table states for each database table within said database system;

setting the table state for a database table to an interrupted state upon encountering an error during a database operation affecting said database table, said database operation comprising a query issued during a user session that causes said database table to transition into said interrupted state;

setting the table state for at least one additional database table affected by a query issued during said user session to an interrupted state; and executing a restore operation to restore said database table having an interrupted state to an active state; and executing a restore operation to restore said at least one additional database table having an interrupted state to an active state; and wherein:

the step of executing a restore operation to restore said database table having an interrupted state to an active state, and the step of executing a restore operation to restore said at least one additional database table having an interrupted state to an active state are attempted at periodic intervals.

3. A computer-implemented method for recovering from database system errors, said method comprising the steps of:

maintaining, within said database system, table states for each database table within said database system;

setting the table state for a database table to an interrupted state upon encountering an error during a database operation affecting said database table, said database operation comprising a query issued during a user session that causes said database table to transition into said interrupted state;

setting the table state for at least one additional database table affected by a query issued during said user session to an interrupted state; and executing a restore operation to restore said database table having an interrupted state to an active state; and executing a restore operation to restore said at least one additional database table having an interrupted state to an active state; and wherein:

the step of executing a restore operation to restore said database table having an interrupted state to an active state, and the step of executing a restore operation to restore said at least one additional database table having an interrupted state to an active state occur in response to a system restart.

4. A computer-implemented method for recovering from database system errors, said method comprising the steps of:

maintaining, within said database system, table states for each database table within said database system;

setting the table state for a database table to an interrupted state upon encountering an error during a database operation affecting said database table, said database operation comprising a query issued during a user session that causes said database table to transition into said interrupted state;

setting the table state for at least one additional database table affected by a query issued during said user session to an interrupted state; and executing a restore operation to restore said database table having an interrupted state to an active state; and executing a restore operation to restore said at least one additional database table having an interrupted state to an active state; and wherein:

the step of executing a restore operation to restore said database table having an interrupted state to an active state, and the step of executing a restore operation to restore said at least one additional database table having an interrupted state to an active state occur in response to a user request.

* * * * *